United States Patent
Oakley

(10) Patent No.: US 7,240,208 B1
(45) Date of Patent: Jul. 3, 2007

(54) ENCRYPTING DIGITAL CAMERA WITH AUTOMATIC ENCRYPTION KEY DELETION

(75) Inventor: Ernest C. Oakley, Pasadena, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 737 days.

(21) Appl. No.: 10/424,287

(22) Filed: Apr. 23, 2003

(51) Int. Cl.
*H04L 9/00* (2006.01)

(52) U.S. Cl. ................ 713/179; 380/210; 380/246; 348/207.99; 348/441

(58) Field of Classification Search ............. 713/176, 713/179; 380/37, 210, 265, 246; 348/207.99, 348/441
See application file for complete search history.

(56) References Cited

U.S. PATENT DOCUMENTS

| | | | | |
|---|---|---|---|---|
| 5,499,294 | A * | 3/1996 | Friedman ................ | 713/179 |
| 5,546,461 | A * | 8/1996 | Ibaraki et al. .......... | 380/217 |
| 5,790,193 | A * | 8/1998 | Ohmori .................. | 348/375 |
| 5,862,217 | A * | 1/1999 | Steinberg et al. ...... | 713/176 |
| 5,898,779 | A * | 4/1999 | Squilla et al. .......... | 713/176 |
| 5,995,630 | A * | 11/1999 | Borza ..................... | 380/54 |
| 6,397,334 | B1 * | 5/2002 | Chainer et al. ........ | 713/176 |
| 6,433,818 | B1 * | 8/2002 | Steinberg et al. ...... | 348/161 |
| 6,968,058 | B1 * | 11/2005 | Kondoh et al. ........ | 380/200 |
| 7,095,853 | B2 * | 8/2006 | Morishita ............... | 380/201 |
| 2001/0018743 | A1 * | 8/2001 | Morishita ............... | 713/193 |
| 2002/0146118 | A1 * | 10/2002 | DiSanto ................ | 380/37 |
| 2003/0223614 | A1 * | 12/2003 | Robins et al. .......... | 382/100 |
| 2004/0085446 | A1 * | 5/2004 | Park ...................... | 348/143 |
| 2004/0162981 | A1 * | 8/2004 | Wong .................... | 713/161 |

OTHER PUBLICATIONS

Oxford on-line dictionary, http://dictionary.oed.com/entrance.dtl, Oxford University Press 2007, on the definition of the word "overwrite" under 1/c computing.*

* cited by examiner

*Primary Examiner*—Kim Vu
*Assistant Examiner*—April Shan
(74) *Attorney, Agent, or Firm*—Mark Homer

(57) ABSTRACT

A digital video camera includes an image sensor capable of producing a frame of video data representing an image viewed by the sensor, an image memory for storing video data such as previously recorded frame data in a video frame location of the image memory, a read circuit for fetching the previously recorded frame data, an encryption circuit having an encryption key input connected to receive the previously recorded frame data from the read circuit as an encryption key, an un-encrypted data input connected to receive the frame of video data from the image sensor and an encrypted data output port, and a write circuit for writing a frame of encrypted video data received from the encrypted data output port of the encryption circuit to the memory and overwriting the video frame location storing the previously recorded frame data.

12 Claims, 4 Drawing Sheets

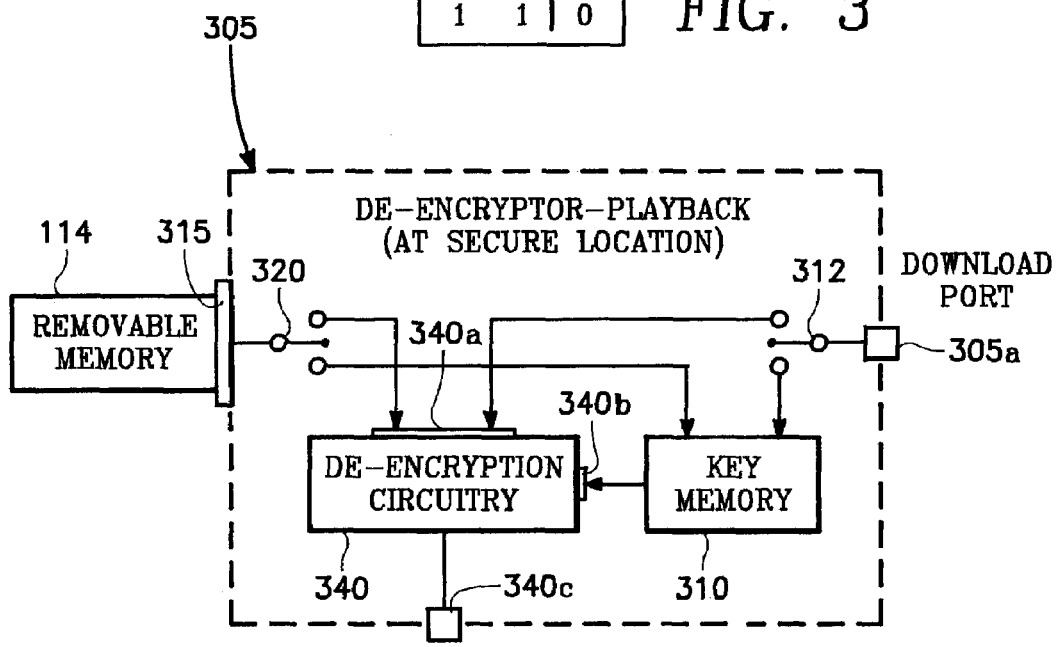
FIG. 3
FIG. 4
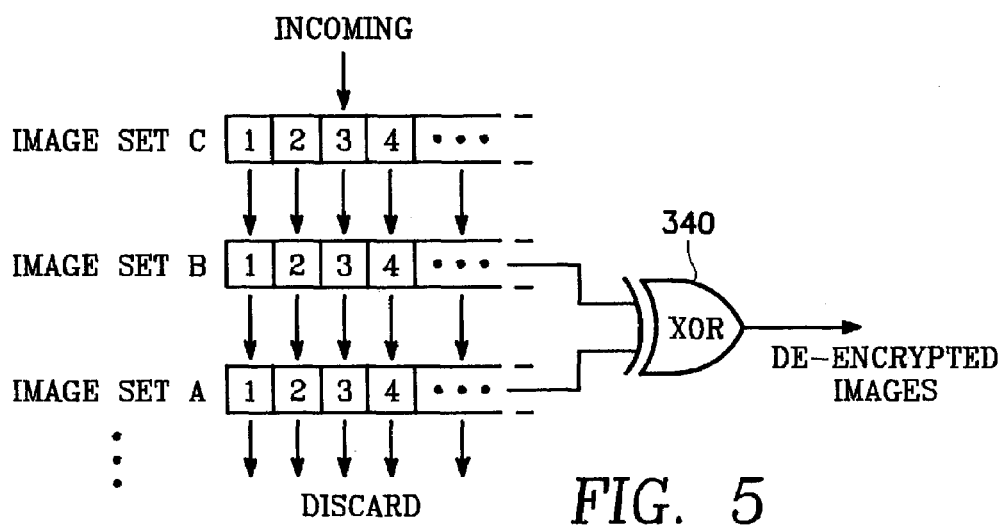
FIG. 5

ENCRYPTING DIGITAL CAMERA WITH AUTOMATIC ENCRYPTION KEY DELETION

BACKGROUND OF THE INVENTION

Professional photographers make their livelihood by capturing valuable images of great interest that others have not captured. Their financial reward often depends upon their exclusive possession of those images. This requires care that their images not fall into the hands of their competitors, for example, through theft of their camera or theft of the storage medium (e.g., a digital disk) on which the valuable images have been stored. As one possible example, an electronic transmission via the internet of the photographer's valuable images from a remote location to his publisher can be intercepted by another publisher or competitor who then uses those images. In such a case, the value of the photographer's own images is reduced, since the images are no longer exclusively possessed or sold by his publisher.

As another example, the photographer may have caught a criminal on camera, and government authorities may confiscate the camera and storage media (film or disk) pursuant to a criminal investigation. In such a case, the government authorities have no need to deal with the photographer, as they can develop or print the images themselves without assistance from the photographer. The authorities therefore need not return the camera or the film/disk to the photographer, regardless of the financial impact such a loss places on the photographer.

As a further example, the photographer may be an amateur who wishes to maintain his images in complete secrecy, and is therefore forced to take drastic steps to prevent any theft of his camera or its film or disk.

One possibility might be for the photographer to use a digital camera that captures each still image as video data, and to first encrypt the video data before storing or recording it on storage media (a removable diskette) in the camera. This would frustrate attempts to steal the images by copying them from the encrypted data. Thus, someone who steals the diskette or who intercepts a transmission (e.g., on the internet) of the encrypted image, would not be able to see the photographers' images. The photographer would ensure that his publisher possesses the encryption key used in the camera to encrypt the images as recorded on the camera diskette. The publisher would use the key to de-encrypt each of the received images.

Such an approach is not practical. First, the digital camera would necessarily require circuitry to electronically store the encryption key in a retrievable form and circuitry to encrypt each block of video data with the encryption key. Secondly, theft of the camera would compromise the key, since the encryption circuitry within the camera must contain or store the encryption key in order to function. Such a theft would therefore allow an unauthorized person possessing the camera and skilled in extracting the key from the camera to decrypt the video data stored on the diskette (or any other video data recorded by that camera). Third, if the encryption key were compromised secretly by some other means not involving the camera (so that the camera continues to be used), every image ever encrypted and recorded by that camera, whether in the past or in the future, would be compromised. Many opportunities for stealing the encryption key can arise. For example, generation of the encryption key (e.g., by a random number generator) must involve a number of persons, including those responsible for generating keys, those who assign keys to certain cameras and load the keys to the cameras, and a documentation system (presumably held at a safe location) correlating different cameras with their different encryption keys for later decryption of images received from various photographers. Thus, the camera user must always consider the possibility that, unbeknownst to him, the encryption key may have fallen into the wrong hands either through his negligence or that of his publisher (who must also have the same key or a related key). This would compromise all of the images taken with the camera during the life of the camera. From the foregoing it can be seen that another disadvantage of an encrypting digital camera is that an elaborate set of precautionary procedures must be employed in the administration of the encryption key and any related keys. Mathematically related encryption keys capable of decrypting the same encrypted data are often distinguished as "public" and "private" keys, in which one is disseminated while the other is not. All such schemes involve a significant risk that the key may be compromised at any time without the knowledge of the authorized users.

A further disadvantage of an encrypting digital camera is that the presence inside the camera of circuitry storing an elaborate encryption key and related encrypting apparatus could alert a skilled thief in possession of the camera that any seemingly innocent noise present on the camera's diskette or memory may actually contain valuable video data retrievable via decryption, thus motivating the thief to search for the encryption key either in the camera or through another theft involving the encryption key administration documentation at the supposedly secure location.

Thus, it has not seemed practical or possible to implement a fool-proof encrypting digital camera.

SUMMARY OF THE INVENTION

A digital video camera includes an image sensor capable of producing a frame of video data representing an image viewed by the sensor, an image memory for storing video data such as previously recorded frame data in a video frame location of said image memory, a read circuit for fetching the previously recorded frame data, an encryption circuit having an encryption key input connected to receive said previously recorded frame data from said read circuit as an encryption key, an un-encrypted data input connected to receive said frame of video data from said image sensor and an encrypted data output port, and a write circuit for writing a frame of encrypted video data received from said encrypted data output port of said encryption circuit to said memory and overwriting the video frame location storing the previously recorded frame data. The previously recorded frame data that serves as an encryption key for the later recorded image can itself be an image or it can be a bit pattern, such as that produced, for example, by a random number generator.

The write circuit in one embodiment can write said frame of encrypted video data to the frame location in said image memory of said previously recorded frame data, so that it overwrites the encryption key of said frame of encrypted video data upon the writing of said frame of encrypted video data to said memory.

A docking station associated with the camera includes a decryption circuit having a decryption key input, and encrypted data input and decrypted data output, a decryption key memory having a memory output port connected to said decryption key input of said decryption circuit and a memory input port for receiving a decryption key to be stored in said decryption key memory.

A method of operating a digital video camera having an image memory, includes filling said image memory with a first set of images, encrypting a second set of images captured by said camera using respective ones of said first set of images as respective encryption keys, to produce an encrypted version of said second set of images, and storing the encrypted version of said second set of images in said image memory by overwriting said first set of images.

BRIEF DESCRIPTION OF THE DRAWINGS

FIG. 3 is illustrates a truth table that can be employed in the encryption circuit of FIG. 2.

FIG. 4 is a schematic block diagram of a playback or docking station for the camera of FIG. 1.

FIG. 5 is a flow diagram illustrating one mode of operating the docking station of FIG. 4.

DETAILED DESCRIPTION OF THE INVENTION

Figure 1:
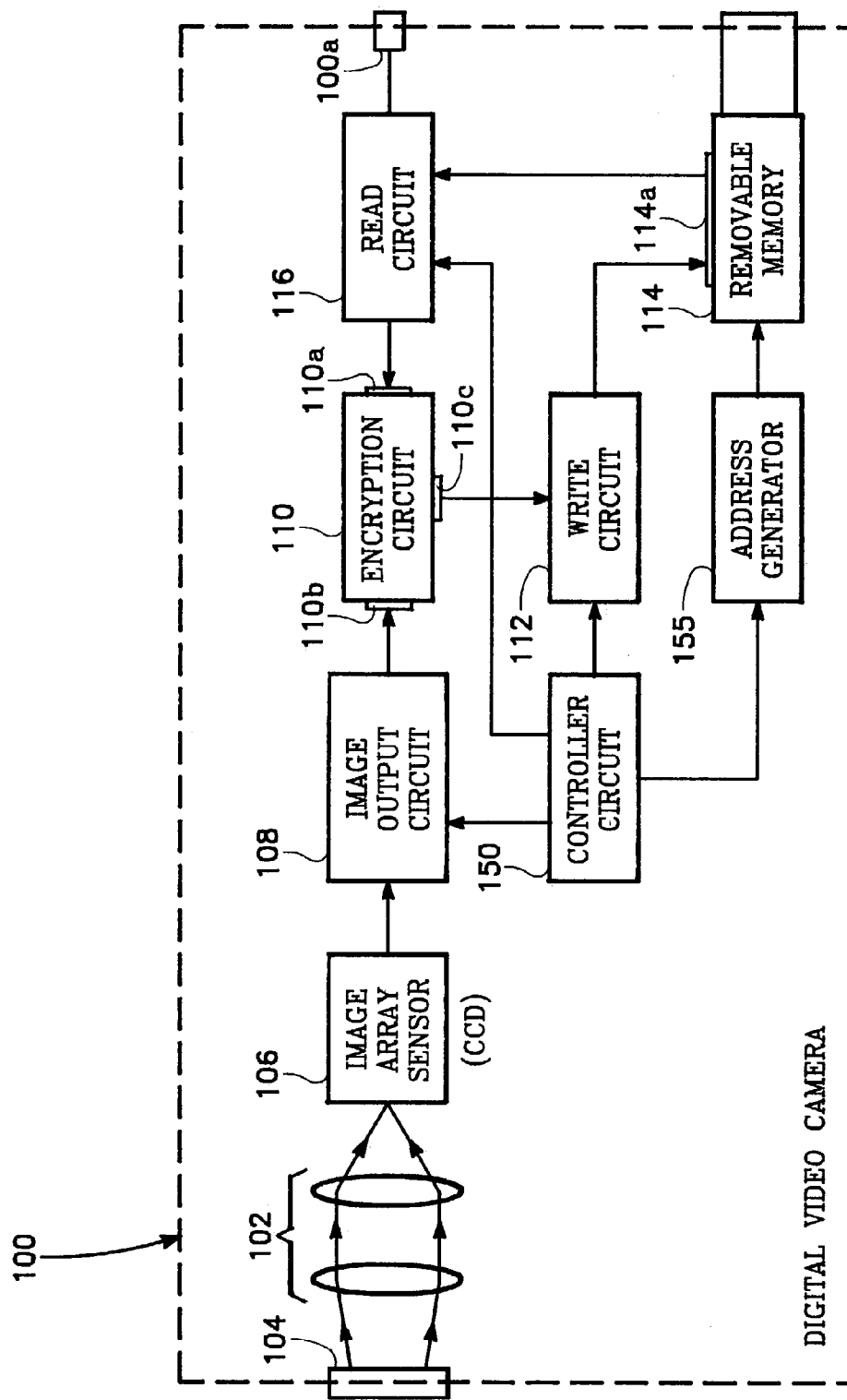
FIG. 1 is a schematic block diagram of a digital video camera embodying some aspects of the invention.

Referring now to FIG. 1, a digital video camera 100 includes a lens assembly 102 that receives light from a scene to be photographed through a camera aperture 104. An electronic light sensor 106, such as a charge coupled device (CCD) array, converts the light from the scene to electronic impulses, which an image output circuit 108 converts to video data representing the image captured by the sensor 106. The image is one video frame and represents all of the picture elements (pixels) of the CCD array 106. Typically, the video data representing the video frame is arranged in plural blocks of serial data bits. An encryption circuit 110 encrypts the video data from the image output circuit 108 in a manner to be described later in this specification. A write circuit 112 causes the encrypted video data to be written to a high-speed memory 114 via its data port 114a. The memory may be an optical memory such as a re-writable compact disk, or a removable flash memory card, or a magnetic read/write system with a removable floppy disk. The camera 100 may have an optional capability of displaying video images sensed by the sensor 106 or unencrypted images previously recorded in the memory 114. (How unencrypted images can be recorded by the camera 100 will be described later in this specification.) In this case, a read circuit 116 fetches video data from the memory 114 through the data port 114a and sends it to an output port 100a of the camera. This data can be converted into an analog video signal that can be displayed on an external video monitor. It should be noted that the camera 100 itself can include a video monitor for viewing video images previously recorded in the memory 114 or for viewing images as they are sensed in real time by the CCD array 106.

The purpose of the encryption circuit 110 is to prevent unauthorized access to the images stored in the memory 114. An image sensed by the CCD array 106 is encrypted by the encryption by the encryption circuit 110 using an encryption key with which the encrypted images may later be decrypted. The encryption key must be present in the camera and therefore if the camera falls into unauthorized hands, the key could be compromised and all of the images stored in the memory could be decrypted by unauthorized persons. However, this problem is overcome in the digital camera of FIG. 1. This is because the encryption circuit 110 encrypts the video images with an encryption key in such a way that security of the images cannot be compromised by a theft of the camera. Specifically, once an encrypted image has been stored in the memory 114, the encryption key for that image is no longer present in (or available from) the camera. Moreover, none of the electronic circuits within camera 100 such as the encryption circuit 110, the read circuit 116 or the write circuit 112 stores the encryption key, making the camera 100 a very simple design almost identical to a conventional digital video camera, with the exception of the encryption circuit 110.

The manner in which the digital video camera 100 encrypts and records video data without retaining an encryption key is to use each "frame" location in the memory 114 (i.e., a location that can store data representing one video frame) as a temporary storage location for an encryption key. Prior to writing a current frame of video data to a current frame location in the memory 114, the encryption key previously stored in the current frame location is fetched by the read circuit 116 and furnished to an encryption key input port 110a of the encryption circuit 10. The current fame of video data from the image output circuit 108 is applied to an un-encrypted data input port 110b of the encryption circuit 110, so that the current frame of video data is encrypted with the key and output at the encrypted data output port 110c of the encryption circuit 110. Then the encrypted frame of video data is written to the current frame location in the memory 114. This operation therefore overwrites the encryption key previously stored in that memory fame location. Thus, the mere act of encrypting and writing the frame of video data to the memory 114 causes the corresponding key to be overwritten so that it disappears from the memory 114. This makes the camera 110 and memory 114 completely secure and impervious to decryption by unauthorized sources. All of this requires, of course, that a copy of the encryption key previously recorded on the memory 114 be stored at a secure location so that the encrypted images stored in the memory 114 can be retrieved later.

Another feature to further enhance security of the encrypted images is to record different encryption keys in the different memory frame locations. In this way, the compromise of one encryption key compromises only a single video frame stored in the memory 114. Since a different encryption key is used to encrypt each of the different images, the task facing a potential thief who must crack a different encryption key for each different video frame recorded in the memory 114 is rendered nearly impossible.

Referring again to FIG. 1, the read circuit 116 fetches the encryption key stored in a selected frame location in the memory 114 and furnishes this key to the encryption circuit 110. The image output circuit 108 provides the encryption circuit 110 with one frame of video data representing a scene viewed by the CCD array 106. The encryption circuit 110 combines the frame of video data with the encryption key in accordance with an encryption process to produce an encrypted frame of video data. This encrypted frame of video data is sent to the write circuit 112, which causes the encrypted frame of video data to be written to the frame location in memory 114 from which the encryption key was last fetched by the read circuit 116. This overwrites (obliterates) the encryption key that was used to encrypt the frame of video data.

A programmed controller circuit 150 coordinates the operation of the various entities of FIG. 1 to carry out the foregoing operation, including the image output circuit 108, the read circuit 116, the write circuit 112 and an address generator 155 of the memory 114. Thus, the controller 150 can be programmed to time the transfer of one video frame to the encryption circuit 110 from the image output circuit 108 with the selection of the appropriate memory address (or address range) of the frame location in the memory 114 containing the next encryption key to be used in encrypting the one video frame. The controller 150 enables the read circuit 116 to fetch the encryption key from this memory frame location and provide it to the encryption circuit 110. The controller 150 enables the write circuit 112 to write the encrypted video frame to this same memory frame location, by causing the address generator 155 to issue the same address to the address port of the memory 114 during both the reading of the encryption key and the writing of the encrypted image.

Figure 2:
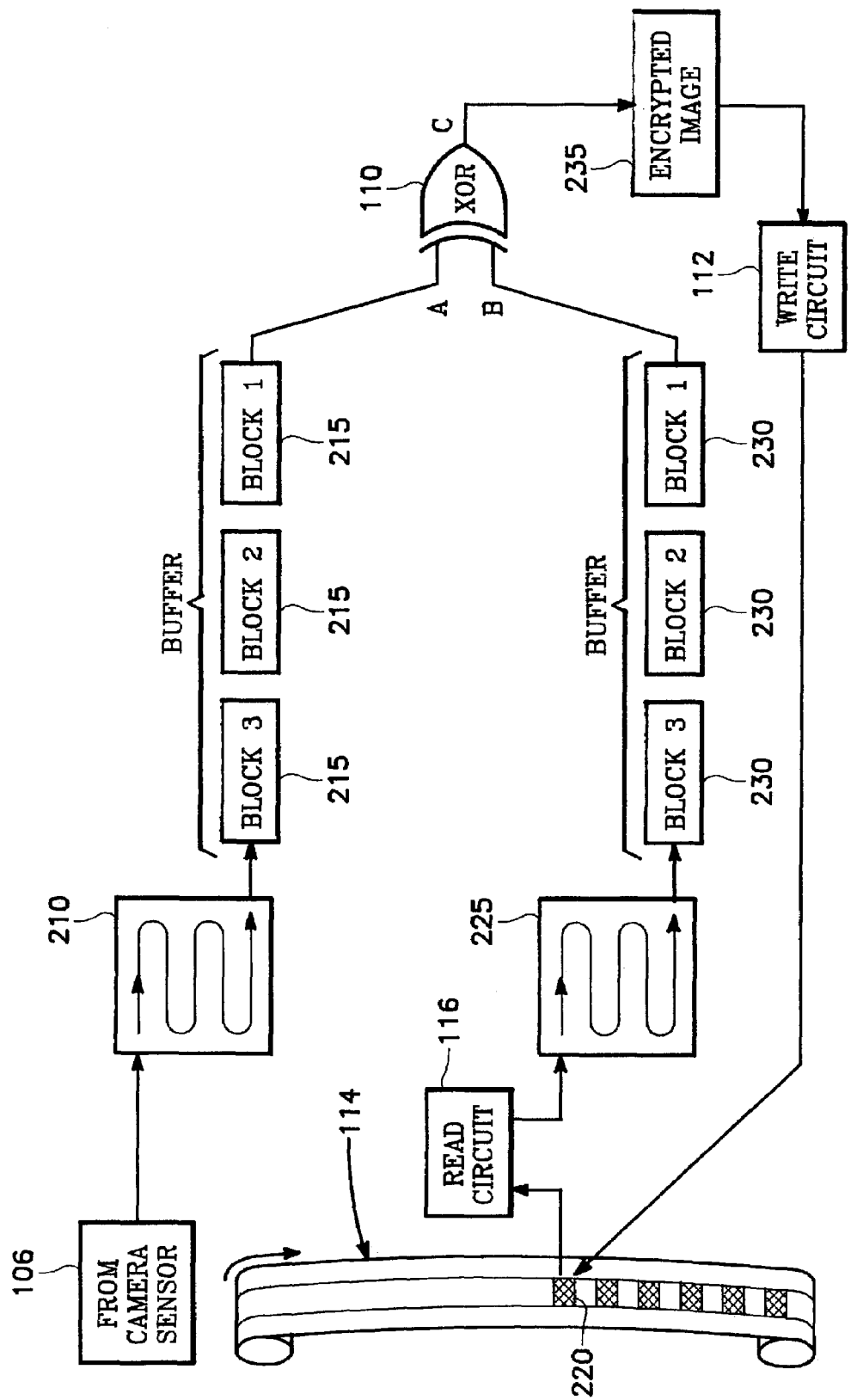
FIG. 2 is a flow diagram illustrating the operation of the camera of FIG. 1.

The foregoing operation is illustrated in FIG. 2. An image represented by a frame of video data 210 is captured by the CCD array 106. The frame of video data 210 is treated as a stream of data bits organized as a sequence of data blocks 215 in the conventional manner. Contemporaneously or simultaneously, an available frame location 220 in the memory 114 is selected and the read circuit 116 fetches an encryption key 225 already stored in the frame location 220. The encryption key 225 may be, for example, a video image previously recorded in the frame location 220, or it could be a bit pattern generated by a random number generator. It may have the same number of bits as a standard frame of video data. The data representing the encryption key 225 is organized into a stream of data blocks 230 (corresponding to the sequence of data blocks 215 of the image to be encrypted) in the conventional manner. The encryption circuit 110 combines each bit in one block 215 with the corresponding bit in the corresponding block 230 to produce an encrypted bit stream or encrypted frame of video data 235. The write circuit 112 then writes the encrypted frame of video data 235 to the same memory frame location 220 from which the encryption key 225 was fetched.

The video data block buffer 215 and the video data block buffer 230 can be smaller than the size required to store one complete video frame, since each frame consists of many such blocks. For this purpose, the address generator 155 should have sufficient resolution to address sub-frame segment sizes. In addition, the output of the write circuit 112 to the memory 114 may have similar buffering, but this is not illustrated in the drawing of FIG. 2.

In the illustration of FIG. 2, the encryption circuit 110 is depicted as an exclusive OR (XOR) gate. However, other encryption processes may be employed within the encryption circuit 110 instead of or in addition to an XOR gate. One advantage of employing only an XOR encryption process is that the same encryption key used to encrypt the image will also de-encrypt it perfectly. FIG. 3 illustrates the truth table of the XOR gate 110 of FIG. 2. The columns labeled "A", "B" and "C" in the table of FIG. 3 correspond to the inputs "A" and "B" and output "C" of the XOR gate 110 of FIG. 2.

Referring to FIG. 4, a docking station 305 may store a copy of the encryption keys stored in the camera memory 114. For this purpose, the docking station 305 has a download port 305a for connection to the external video output port 100a of the camera 100 of FIG. 1. The connection may either be direct or via a remote communication link. The encryption keys (either images or data) recorded in the memory 114 may be transmitted to the docking station 305, where they are stored in a key memory 310. The key memory 310 may be a mass memory such as a hard disk drive, and may further include a copying function for transferring data to or from removable camera memories 114. By moving a switch 312 to the appropriate position, the data downloaded to the port 305a is sent to the key memory 310. Alternatively, if the camera 100 or the removable memory 114 and the docking station 305 are co-located, then the memory 114 may be removed (be it a flash memory card or a disk) and inserted in a memory reader port 315 of the docking station 305. In this case, the user can operate a switch 320 to cause the memory contents to be loaded from the memory reader port 315 to the key memory 310. The memory 114 is then taken away and re-inserted into the camera 100, and the user can then take the camera 100 into the field and begin taking pictures.

After the user has captured the desired images and stored them in the memory 114, they may be played back at the docking station 305. For this purpose, either the contents of the memory 114 are transmitted over the remote link to the download port 305a of the docking station, or the removable memory 114 is taken from the camera and connected to the memory reader port 315 of the docking station 305. In either case, a respective one of the switches 312, 320 must be positioned so that the incoming data is directed to a decryption circuit 340 rather than the key memory 310. The decryption circuit 340 receives the encrypted image (from either the reader port 315 or from the download port 305a) at its encrypted data input port 340a. The decryption circuit 340 receives the appropriate encryption key (from the key memory 310) at its decryption key input port 340b. The decryption circuit 340 then decrypts the image and outputs it at a decrypted data output port 340c. The decrypted image may then be recorded and/or displayed on a video monitor. If the encryption circuit 110 in the camera 100 is an XOR gate, then the decryption circuit 340 in the docking station is also an XOR gate.

The camera 100 of FIG. 1 is extremely versatile and can be employed in many modes. For example, the encryption keys stored in each memory frame location may simply be the last set of encrypted images recorded in the memory 114. Thus, the same memory 114 or flash memory card or diskette may be re-used any number of times, each new set of images completely filling the memory 114. Then, the images may be downloaded (via a remote communication link for example) to the docking station 305. The docking station 305 stores the received encrypted images as new keys for decrypting the next set of images that may be received later as the memory 114 is reused. The docking station 305 decrypts the received images for display or use. Then, after the camera user overwrites the camera memory 114 with a complete new set of encrypted images and transmits these back to the docking station 305, the docking station decrypts the new images by using the previous set of received images as the encryption/decryption keys.

This concept is illustrated in FIG. 5. In FIG. 5, a succession of image sets (image sets A, B, C, etc.) from the camera 100 are received at successive times by the docking station 305. Each image set can represent as many video images or frames as required to fill the memory 114. Each image set is obtained by the camera user over-writing images previously recorded by the camera 100 on the memory 114 with a complete new set of images. At the instant in time depicted in the snapshot of FIG. 5, image set A was received earlier at the docking station 305, and now image set B has just been received, while image set C has yet to be received. Image set A is used as the set of encryption keys to decrypt image set B by the decrypt circuit 340. For this purpose, images 1, 2, 3, 4, etc., of image set A are the keys used to decrypt images 1, 2, 3, 4, etc., of image set B. Later, after image set C has been received, image set B (the encrypted version as originally received) is used as the set of keys to decrypt image set C in the same manner that image set A was used earlier as the set of keys to decrypt image set B. The camera user should stop taking pictures at least by the time the camera memory 114 becomes full and transmit the recorded encrypted images from the camera memory 114 to the docking station, which may be at a remote (secure) location. Then the user may capture a new set of images with the camera on the same memory 114. The object here is not to re-use the memory merely to save cost, but rather, by re-using the memory, a unique encryption key is automatically provided for each new image or video frame, and its association with that frame is conveyed in precise manner to the docking station based upon the transmission of the previous set of images and the assumption that each sequence of images is always recorded in the same sequence of frame locations in the memory 114.

While the described embodiments place the encryption key in the same memory frame location in which the image it encrypts is to be written, so that the encrypted image over-writes its key, other arrangements may be employed in carrying out the invention. For example, the key that encrypts one video frame may be written in a different memory frame location than the one in which the encrypted video frame is written, although such a feature is not preferred. In any case, the encryption key is over-written contemporaneously when the encrypted image is recorded, either slightly before, or simultaneously with, or slightly after the encrypted image is recorded. The advantage remains therefore in all cases that the encryption key is overwritten so that confiscation or theft of the camera 100 or removable memory 114 cannot compromise the encryption key.

It should be re-emphasized that the encryption key need not be a previous image recorded in the particular memory frame location, but instead could be pure data, such as a randomly generated bit pattern. Moreover, the same encryption key could be used for more than one image, although such a feature is not preferred. This may be accomplished, for example, by recording the same encryption key in different memory frame locations prior to use of the memory 114 in the camera 100.

Figure 6:
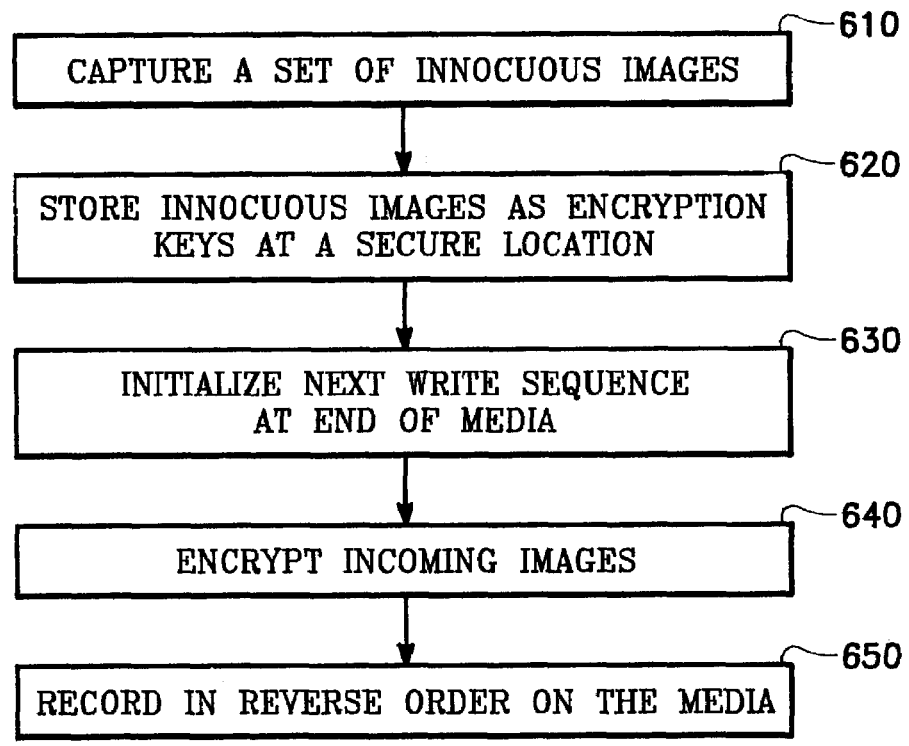
FIG. 6 is a flow diagram illustrating one method of encrypting in accordance with a further aspect of the invention.
Figure 7:
FIG. 7 illustrates the contents of the image memory at an early point in the method of FIG. 6.
Figure 8:
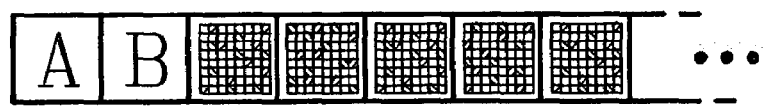
FIG. 8 illustrates the contents of the image memory at a later point in the method of FIG. 6.

FIG. 6 illustrates a protocol that makes detection of the camera 100 as an encrypting camera more difficult. First, the memory is filled sequentially with a set of innocuous images having no apparent value and which are unencrypted as recorded in the memory 114 so as to be easily readable or viewable at a later time (e.g., via the read circuit 116) (step 610 of FIG. 6). Because of the presence of the encryption circuit 110, if the camera 100 is used to capture and record such innocuous images, then the media (memory 114) must contain all zero bits in order for such innocuous images to be readable (unencrypted). This mode would therefore be preceded by a preliminary step (not indicated in FIG. 6) of zeroing out the media or memory 114. Alternatively, the removable memory 114 could be separately loaded with such innocuous unencrypted images prior to being inserted in the camera 100 (in which case it would not be necessary to take the special preliminary step referred to above of zeroing out the memory 114). These innocuous images (FIG. 7) are furnished to the docking station 305 as encryption keys for use in encrypting a subsequent set of images (step 620 of FIG. 6). The controller 150 now commands the write process to begin at the "end" memory frame location rather than the "beginning" memory location (where the camera typically begins recording at a first memory frame location) (step 630). The camera user begins taking valuable pictures, which are encrypted as described above using the previous images as encryption keys (step 640 of FIG. 6). These encrypted images are recorded in the memory 114 as described above, thus over-writing the previously recorded innocuous images. However, this over-writing is carried out in reverse order, beginning at the end of the memory or media (i.e., at an "end" memory location) and progressing toward the "beginning" memory location (step 650 of FIG. 6). The definition of "beginning" and "end" memory locations may follow from conventional usage, in which a sequence of video frames are stored on the media in the order in which they are captured beginning at a low memory address and ending at a higher memory address, although this definition may be reversed in some applications. The encrypted images (the "valuable pictures") may not fill the entire memory, so as to leave intact some of the innocuous unencrypted images at the "beginning" memory frame locations. As a result, upon confiscation of the camera and inspection by an unauthorized person, it would appear at first glance that the memory is only partly filled with innocuous images, beginning at the first memory location which are easily read or displayed by ordinary means, and that a remaining portion of the memory or media apparently contains only indecipherable noise (as illustrated in FIG. 8), leading the unauthorized person to conclude that the latter portion of the memory or media is simply unused and contains no images, and furthermore that the camera 100 is an ordinary camera.

A number of advantages can be provided. For example, the camera of FIG. 1 requires no special memory dedicated to storing an encryption key. Also, a different encryption key can be used for each encrypted image. Furthermore, once an encryption key is used, it is erased from memory so that theft of the camera or of the removable memory cannot compromise the key. Additionally, the camera requires no special encryption key, since the prior contents of the image memory can serve as the encryption keys for the subsequently recorded images. Thus, even though a different encryption key can be used to encrypt the different images as they are captured by the camera, there is no requirement for a correspondingly large pre-existing set of encryption keys to accommodate all of the encryption tasks. The only requirement is that each previous set of memory contents be saved in another memory (e.g., a remote memory) that can be accessed later after the camera memory has been over-written. The contents can either be predetermined codes or bit-patterns or they may be successive sets of images captured by the camera.

While the invention has been described with respect to embodiments in which each image that is encrypted is one video frame, each video field (i.e., the odd or even field) of one frame could be encrypted separately, or, alternatively, each image could be only one video field. Furthermore, while the invention has been described with respect to embodiments in which the same key is used to both encrypt and decrypt an image, the encrypt key and the decrypt key may instead be different but mathematically related to one another, using conventional techniques.

While the invention has been described in detail by specific reference to preferred embodiments, it is understood that variations and modifications there of may be made without departing from the true spirit and scope of the invention.

What is claimed is:

1. A digital video camera system comprising:
  a digital video camera comprising:
    an image sensor capable of producing a new frame of video data representing an image viewed by the sensor;
    an image memory for storing a plurality of the frames of video data representing a plurality of images;
    a read circuit for fetching one of the pluralities of the frames of video data from said image memory;
    an encryption circuit having an encryption key input connected to receive the one of the plurality of the frames of video data from said read circuit as an encryption key, an un-encrypted data input connected to receive said new frame of video data from said image sensor wherein said new frame of video data is encrypted using the encryption key, and an encrypted data output port; and
    a write circuit for writing the frame of encrypted video data received from said encrypted data output port of said encryption circuit to said image memory and overwriting said encryption key, wherein said encryption key no longer resides in the image memory.

2. The digital video camera system of claim 1 wherein the plurality of the frames of video data are transferred to a decryption key memory, outside of the digital video camera, for use as a plurality of decryption keys, each of the plurality of decryption keys comprising the frame of video data overwritten by the frame of encrypted video data.

3. The digital video camera system of claim 2 further comprising:
  a docking station comprising:
    a decryption circuit having a decryption key input, and encrypted data input and decrypted data output;
    the decryption key memory having a memory output port connected to said decryption key input of said decryption circuit and a memory input port for receiving a decryption key to be stored in said decryption key memory.

4. The digital video camera system of claim 3 wherein said image memory comprises memory media that is removable from said camera, and said docking station comprises an image memory port into which said image memory is insertably connectable.

5. The digital video camera system of claim 4 further comprising switches for connecting said image memory port alternatively to said encrypted data input of said decryption circuit and to said memory input port of said decryption key memory.

6. A digital video camera comprising:
  an image sensor capable of producing a new frame of video data representing an image viewed by the sensor;
  an image memory for storing a plurality of frames of data;
  a read circuit for fetching one of the plurality of frames of data within said image memory;
  an encryption circuit having an encryption key input connected to receive said one of the plurality of frames of data from said read circuit as an encryption key, an un-encrypted data input connected to receive said new frame of video data from said image sensor wherein said new frame of video data is encrypted using the encryption key and an encrypted data output port; and
  a write circuit connected between said encrypted data output port and said memory wherein said write circuit overwrites the encryption key with the encrypted frame of video data.

7. The digital video camera of claim 6 wherein said plurality of frames of data comprise video images previously captured by said camera.

8. The digital video camera of claim 6 wherein said plurality of frames of data comprise predetermined frames of data not representing an image.

9. A method of capturing images in a digital video camera having an image sensor output circuit and an image memory having plural frame locations for storing respective frames of video data, comprising:
  providing an encryption circuit in said camera;
  selecting a successive one of said frame locations in said image memory, and copying the contents thereof to an encryption key input of said encryption circuit;
  capturing an image with said camera and transmitting a frame of video data representing said image from said image sensor output circuit to an un-encrypted data input of said encryption circuit, whereby said encryption circuit encrypts said frame of video data using said contents of the selected one of said frame locations as an encryption key to produce an encrypted frame of video data;
  writing said encrypted frame of video data to said image memory in the selected one of said frame locations to overwrite said encryption key, wherein said encryption key no longer resides in the image memory.

10. The method of claim 9 wherein the overwritten prior contents of said selected one of said frame locations comprises a decryption key for said encrypted frame of video data.

11. The method of claim 9, wherein said selecting set is preceded by storing different initial frames of video data in different ones of said frame locations in said memory prior to the step of capturing an image with said camera, whereby said initial frames of video data ultimately serve as encryption keys for images later captured by said camera.

12. The method of claim 9, wherein the selecting step is preceded by storing different bit patterns in different ones of said frame locations in said memory prior to the step of capturing an image with said camera, whereby said bit patterns ultimately serve as encryption keys for images later captured by said camera.

* * * * *